US010024706B2

(12) United States Patent
Pierce

(10) Patent No.: US 10,024,706 B2
(45) Date of Patent: Jul. 17, 2018

(54) GUTTER OBSTRUCTION GAUGE APPARATUS

(71) Applicant: Thomas O. Pierce, Lewisburg, PA (US)

(72) Inventor: Thomas O. Pierce, Lewisburg, PA (US)

(*) Notice: Subject to any disclaimer, the term of this patent is extended or adjusted under 35 U.S.C. 154(b) by 123 days.

(21) Appl. No.: 15/351,232

(22) Filed: Nov. 14, 2016

(65) Prior Publication Data
US 2017/0138779 A1 May 18, 2017

Related U.S. Application Data

(60) Provisional application No. 62/254,613, filed on Nov. 12, 2015.

(51) Int. Cl.
G01F 23/20 (2006.01)
G01F 23/30 (2006.01)
E04D 13/064 (2006.01)
G01F 23/76 (2006.01)

(52) U.S. Cl.
CPC ............ G01F 23/30 (2013.01); E04D 13/064 (2013.01); G01F 23/76 (2013.01); G01F 23/20 (2013.01)

(58) Field of Classification Search
CPC .......... G01F 23/32; G01F 23/58; G01F 23/30; G01F 23/76
See application file for complete search history.

(56) References Cited

U.S. PATENT DOCUMENTS

| 1,530,738 | A | * | 3/1925 | Resek | G01F 23/34 116/110 |
| 2,904,923 | A | * | 9/1959 | Conyers | A01K 93/00 43/43.11 |
| 3,176,707 | A | * | 4/1965 | Wilson | A01K 7/04 137/315.08 |
| 3,200,646 | A | * | 8/1965 | Donko | G01F 23/36 73/313 |
| 3,216,146 | A | * | 11/1965 | Johnson | A01K 93/00 43/27.4 |
| 3,586,032 | A | * | 6/1971 | Weinstein | F16K 24/048 137/202 |
| 3,791,296 | A | * | 2/1974 | Vogt | B63B 35/08 102/406 |

(Continued)

FOREIGN PATENT DOCUMENTS

DE 3011357 A1 * 10/1981 ........... G01F 23/303
FR 2887477 A1 * 12/2006 ............... C25D 7/04
(Continued)

Primary Examiner — David A Rogers
(74) Attorney, Agent, or Firm — Sonya C. Harris; Invention Services

(57) ABSTRACT

A gutter obstruction gauge apparatus providing a visual indicator of an obstructed gutter by providing a gauge device that provides indication that a gutter is full and needs clearing. The instant gutter obstruction gauge apparatus becomes visible within a gutter when the gutter is filled with debris and requires cleaning. The instant invention advantageously allows for the ability of maintaining the gutters and increasing the performance of the gutter and draining structures. The instant gutter obstruction gauge apparatus is a lightweight uncomplicated structure comprised of readily available materials allowing for easy and low cost manufacture.

6 Claims, 7 Drawing Sheets

(56) References Cited

U.S. PATENT DOCUMENTS

| | | | | | |
|---|---|---|---|---|---|
| 3,916,557 | A | * | 11/1975 | Taylor | A01K 95/00 43/43.12 |
| 3,926,143 | A | * | 12/1975 | Hothan | G01F 23/58 116/228 |
| 4,167,951 | A | * | 9/1979 | Hume | F16K 33/00 137/426 |
| 4,399,338 | A | * | 8/1983 | Jones | H01H 29/20 200/81.6 |
| 4,484,405 | A | * | 11/1984 | Woods | A01K 93/00 43/1 |
| 4,557,144 | A | * | 12/1985 | Lucchini | G01F 23/36 338/33 |
| 4,854,340 | A | * | 8/1989 | Pavlik | E03D 1/14 137/425 |
| 4,858,369 | A | * | 8/1989 | Collins | A01K 91/18 43/17.5 |
| 4,928,526 | A | * | 5/1990 | Weaver | G01D 5/165 338/33 |
| 5,081,720 | A | * | 1/1992 | Ames | E03D 1/306 4/324 |
| 5,152,170 | A | * | 10/1992 | Liu | G01F 23/32 116/229 |
| 5,333,499 | A | * | 8/1994 | Gaston | G01F 23/32 73/317 |
| 5,431,047 | A | * | 7/1995 | Coha | G01F 23/32 73/317 |
| 6,397,526 | B1 | * | 6/2002 | Saul | E04D 13/076 4/394 |
| 6,401,382 | B2 | * | 6/2002 | Larkin | A01K 91/06 43/4 |
| D466,582 | S | * | 12/2002 | Haney | D22/146 |
| 6,786,091 | B1 | * | 9/2004 | Aleali | G01F 23/30 73/305 |
| 7,401,571 | B1 | * | 7/2008 | Creed | E04D 13/0767 116/228 |
| D627,438 | S | * | 11/2010 | Cox | D23/236 |
| 9,593,977 | B2 | * | 3/2017 | Mahmoud | G01F 23/30 |

FOREIGN PATENT DOCUMENTS

| | | | | | |
|---|---|---|---|---|---|
| GB | 293091 | A | * | 6/1928 | F16K 31/26 |
| GB | 866618 | A | * | 4/1961 | G01F 23/34 |
| GB | 1406871 | A | * | 9/1975 | B63B 21/20 |
| GB | 2189870 | A | * | 11/1987 | F16K 31/24 |
| KR | 20110058584 | A | * | 6/2011 | |

* cited by examiner

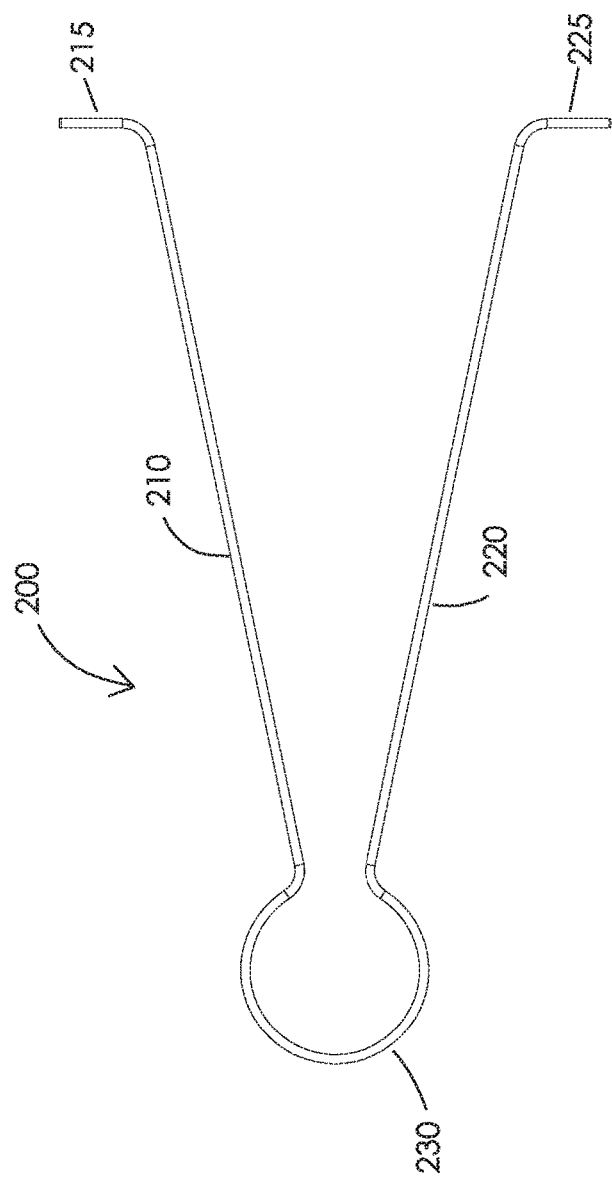

US 10,024,706 B2

GUTTER OBSTRUCTION GAUGE APPARATUS

FIELD OF INVENTION

This invention relates to a gutter debris indicating device and, more particularly, to a device that gauges the amount of debris collected within the gutter.

BACKGROUND

Gutters are commonly used on buildings to collect rainwater flowing from a sloped roof and to direct the rainwater away from the building. Gutters not only prevent soil erosion adjacent to the building but also reduce damage to foundations and basements caused by water seepage into the soil adjacent to the building. A problem associated with gutters is the tendency to collect leaves and other debris within the gutter. Often the collected leaves and other debris clog the gutter rendering the gutter ineffective to collect rainwater. A gutter that becomes clogged with debris may overflow leading to landscaping erosion, damage to foundations and basements. Water seepage from a clogged gutter under the eaves of a roof can cause structural damage to the facia and soffits of a roof, and also to building walls and ceilings.

Water seepage and overflow from a blocked gutter can also enhance the potential for mold and fungal growth within the attic, adjacent walls and basements of a building. A clogged gutter can also cause structural damage at the gutter attachment points and damage to the gutter itself (bending and warping) due to the increased weight of water and debris within the gutter. Additionally, a clogged gutter can also provide a site for insect infestations e.g., mosquitoes.

Periodically cleaning out leaves, twigs and other debris that normally accumulate in gutters is typically a maintenance nuisance. For owners and occupiers of one, two and other multiple-family dwellings, this chore usually involves climbing up a ladder and manually removing such debris along the entire lengths of the gutters. Such an exercise involves risk and can even be dangerous. The accidents from falls off of ladders in attempts to complete this cleaning chore can result in sprains, broken limbs and other disabling injuries that are well documented in yearly statistics.

Accordingly, there is a need to overcome such obstacles by having a better indication of the occlusions of the gutter, with improved indication means.

SUMMARY OF THE INVENTION

The present invention addresses the above-described deficiencies and others as described further below. Specifically, the present invention provides a visual indicator of an obstructed gutter by providing a gauge device that provides indication that a gutter is full and needs clearing.

In accordance with an aspect of the present disclosure, the instant gutter obstruction gauge apparatus becomes visible within a gutter when the gutter requires cleaning.

The instant invention advantageously allows for the ability of maintaining the gutters and increasing the performance of the gutter and draining structures.

In accordance with another aspect of the present disclosure, the instant gutter obstruction gauge apparatus has the ability of being easily installed within a gutter structure.

In accordance with another aspect of the present disclosure, the instant gutter obstruction gauge apparatus is a lightweight uncomplicated structure comprised of readily available materials allowing for easy and low cost manufacture.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

BRIEF DESCRIPTION OF THE DRAWINGS

Embodiments of the present disclosure are described herein with reference to the drawings, in which:

FIG. 7 is a diagram of the floater wire that surrounds the floater of the gutter obstruction gauge apparatus.

The novel features which are characteristic of the invention, as to organization and method of use, together with further objects and advantages thereof, will be better understood from the following disclosure considered in connection with the accompanying drawings in which one or more preferred embodiments of the invention are illustrated by way of example. It is to be expressly understood, however, that the drawings are for the purpose of illustration and description only and are not intended as a definition of the limits of the invention.

As used herein, the term "comprises" refers to a part or parts of a whole, but does not exclude other parts. That is, the term "comprises" is open language that requires the presence of the recited element or structure or its equivalent, but does not exclude the presence of other elements or structures. The term "comprises" has the same meaning and is interchangeable with the terms "includes" and "has". The term set has the meaning of one or more of said element. Furthermore, any use of the term "or" as used herein is generally intended to mean "and/or" unless otherwise indicated. Combinations of components or steps will also be considered as being noted, where terminology is foreseen as rendering the ability to separate or combine is unclear.

BRIEF DESCRIPTION

Figure 1:
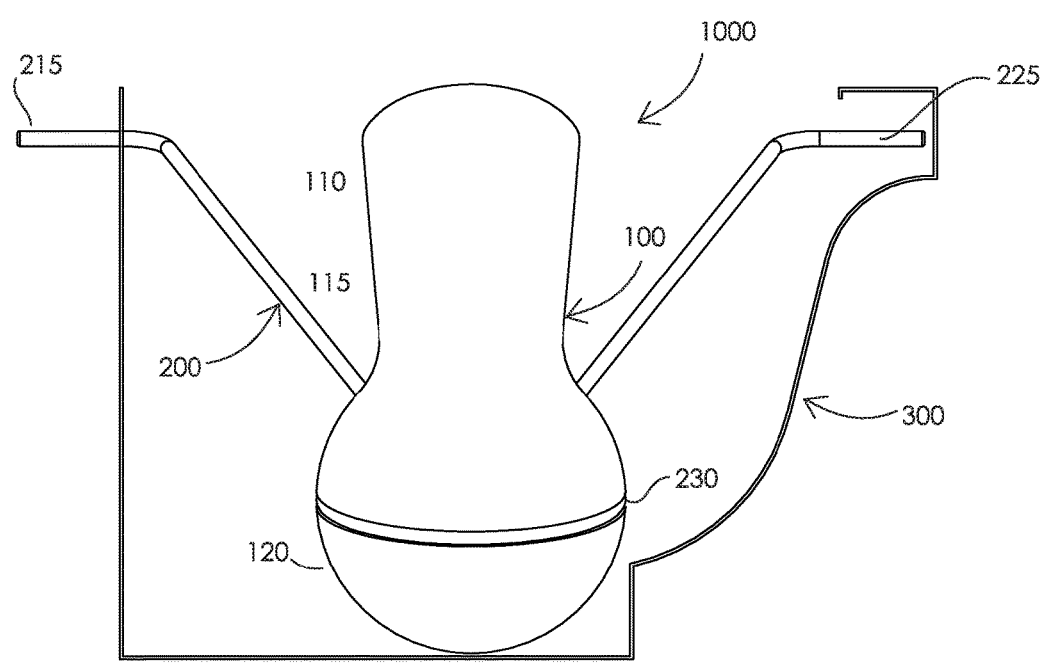
FIG. 1 is an elevational side diagrammatic view of the gutter obstruction gauge apparatus located within a cross sectional view of the gutter structure in accordance with an embodiment of the present invention.
Figure 2:
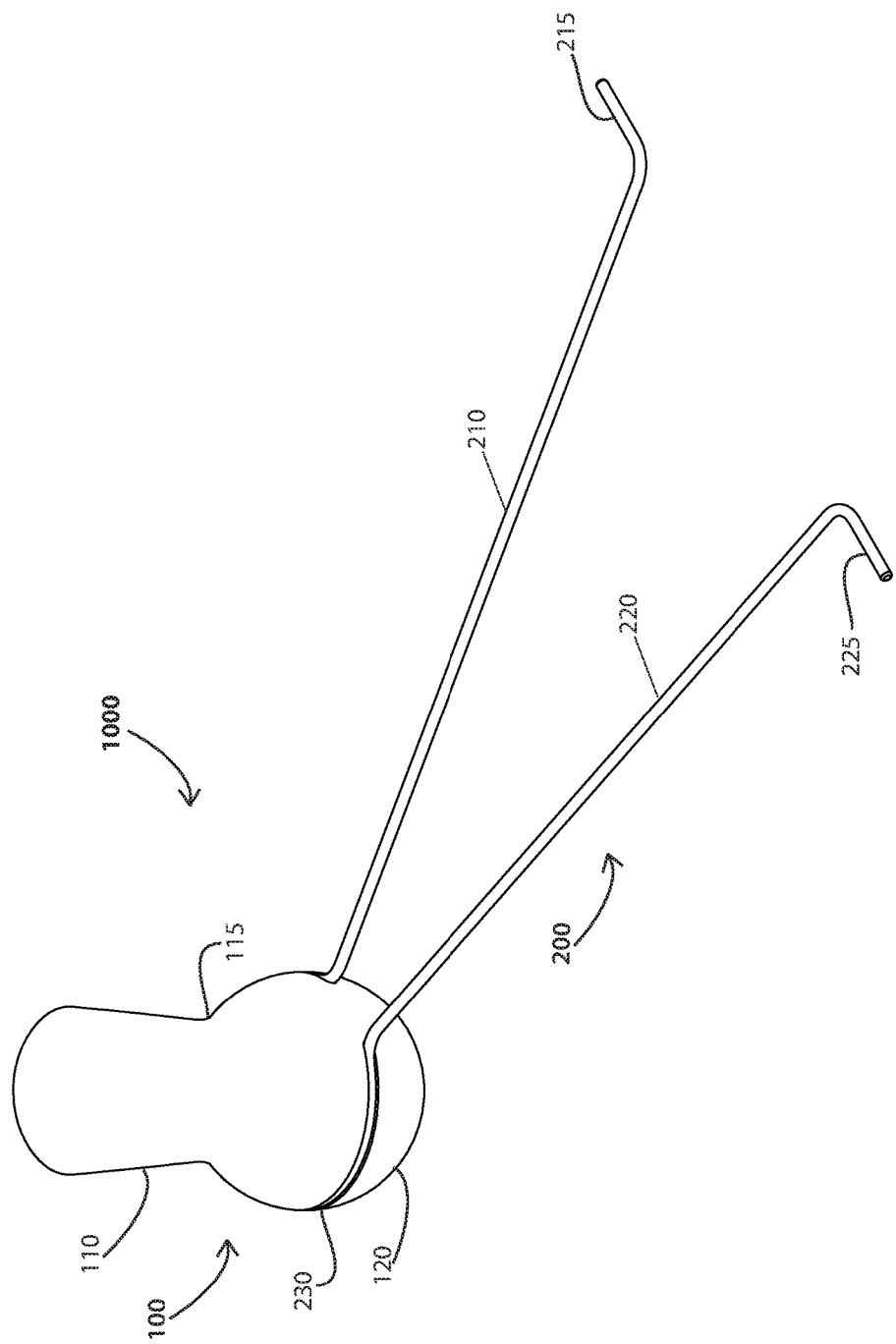
FIG. 2 is a perspective view of the gutter gauge apparatus illustrating the major components thereof.
Figure 3:
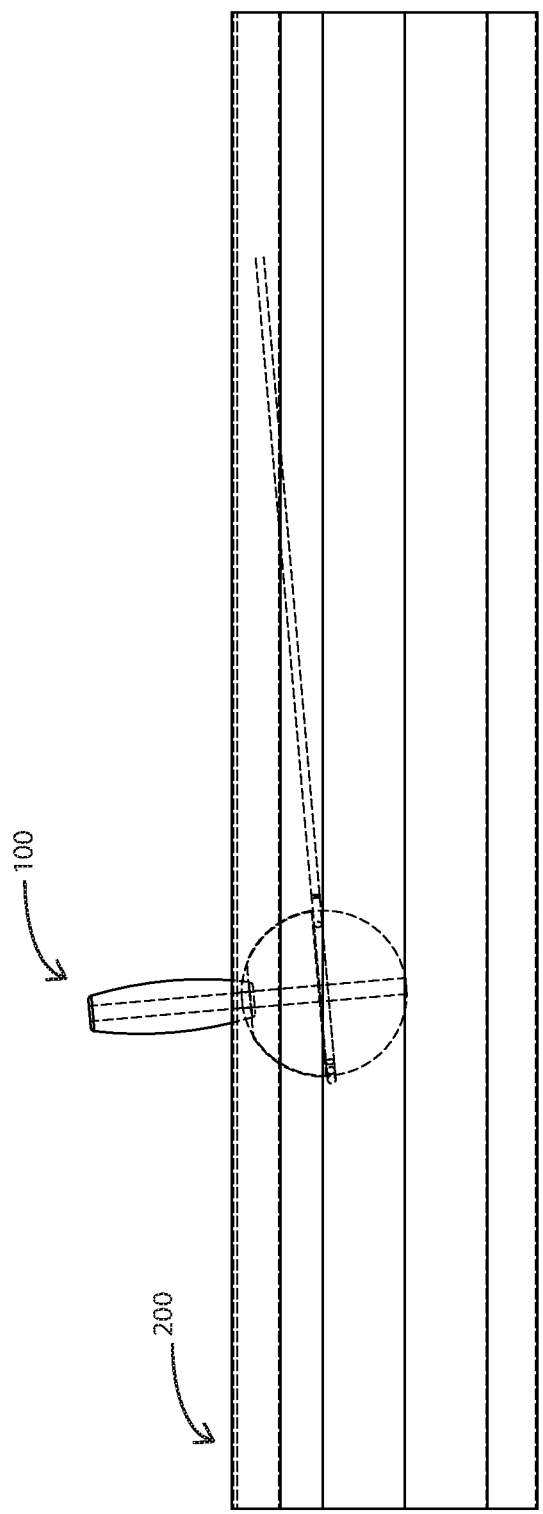
FIG. 3 is an elevational side diagrammatic view of the gutter obstruction gauge apparatus located within an unobstructed gutter structure in accordance with an embodiment of the present invention.
Figure 4:
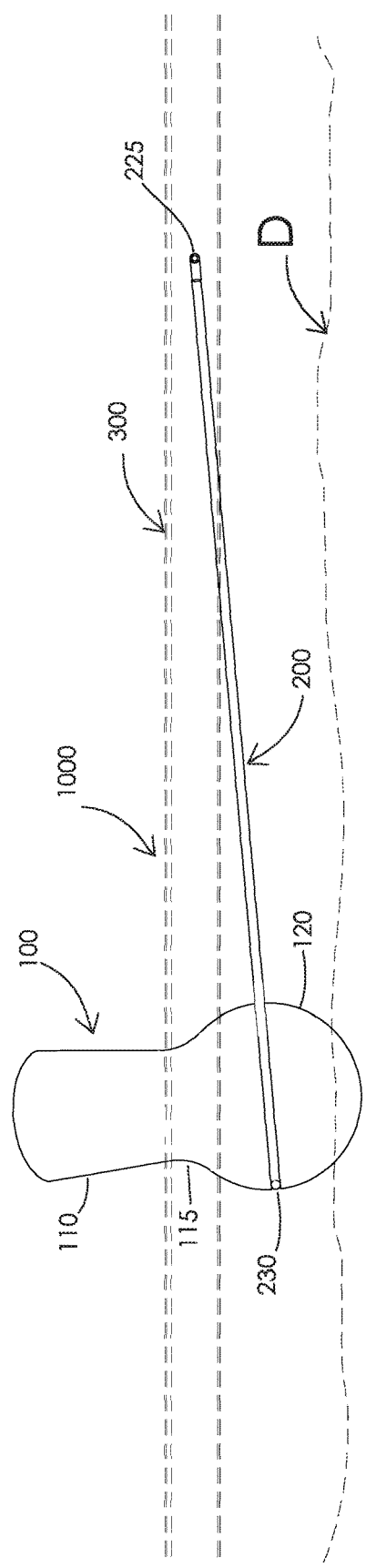
FIG. 4 is an elevational side diagrammatic view of the gutter obstruction gauge apparatus located partially within and partially extended from within an obstructed gutter structure in accordance with an embodiment of the present invention.
Figure 5:
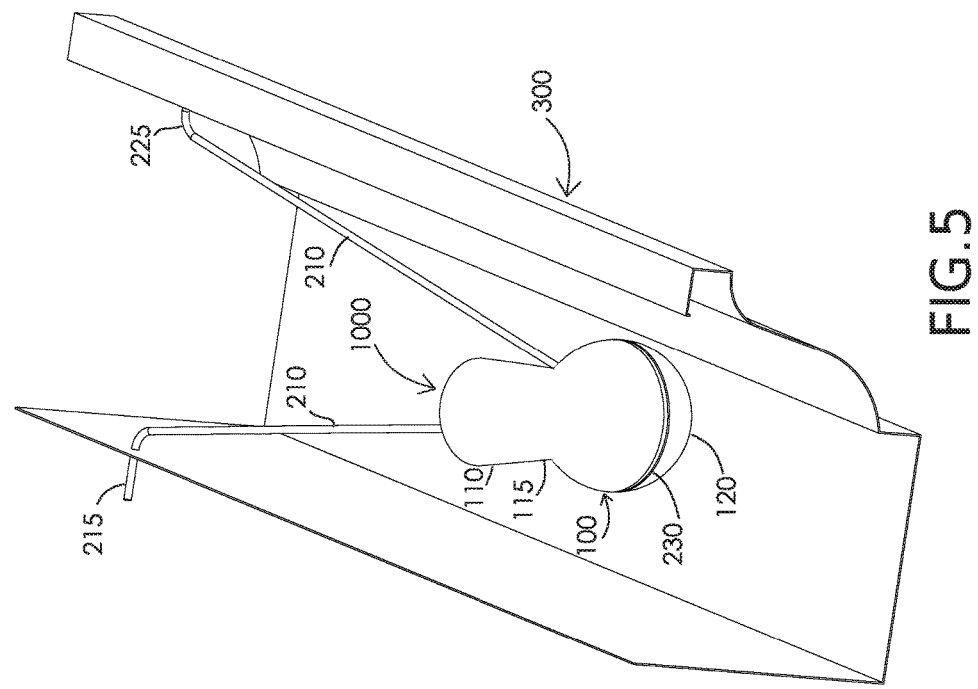
FIG. 5 is a rear perspective view of the gutter gauge apparatus located within a gutter structure.

Referring to FIG. 1, gutter obstruction gauge apparatus (GOGA) 1000 is shown in the resting position within an unobstructed gutter 300. The base of the GOGA 1000 rests on the base of the gutter 300 when the gutter is unobstructed by debris such as leaves, dirt, sludge, etc., and this is shown in FIGS. 1, 3 and 5. The GOGA 1000 is comprised of a float 100 and a float wire 200, which sit within a gutter 300 as illustrated in FIG. 2. FIG. 3 illustrates the GOGA 1000 located within a gutter 300 that is unobstructed and FIG. 4 shows the indicator 110 of the float 100 extending above the gutter apparatus 300 illustrating a position the GOGA 1000 would assume if the gutter 300 was obstructed with debris D.

Figure 6:
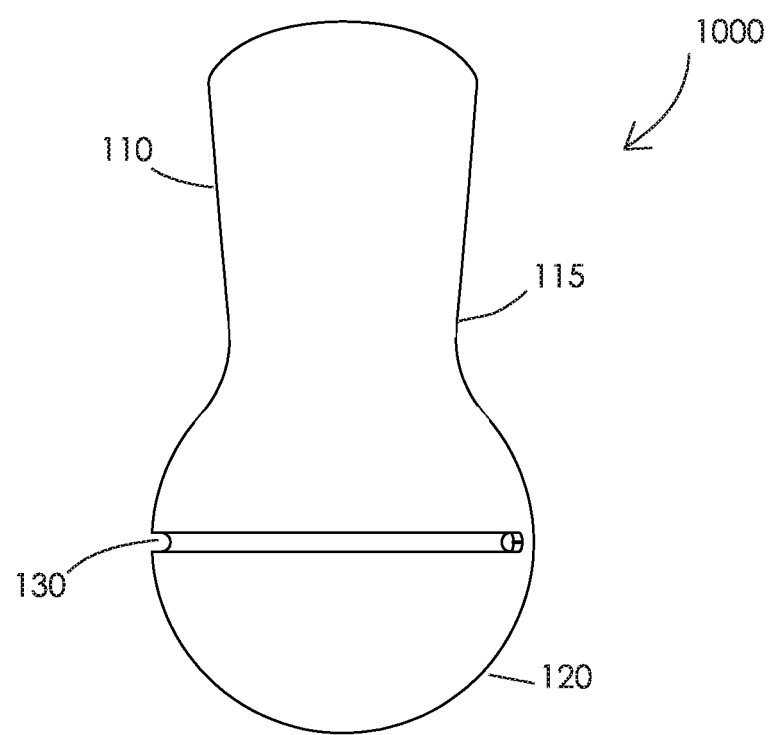
FIG. 6 is an elevational view of the floater device of the gutter obstruction gauge apparatus.

FIG. 6 shows a diagram of the float 100 indicating features of thereof. The float 100 has an indicator 110, which is the top proximal portion extending upwards of the waist 115 and has a conically cylindrical shape. The waist 115 is at the approximate center of the float 100 (being approximately equidistant from the and has the smallest circumference of the float 100. The bottom distal portion of the float is a bulbous base 120 (and is substantially ball shaped), which extends downward from the waist 115 and has the widest circumference of the float 100 structure at an approximate range of 1.5 to 2 inches wide. The float 100 has an approximate height range of 3.5 to 4 inches. The bulbous base 120 contains a groove 130 which serves as an indentation to receive and hold the waistband 230 of the float wire 200. The groove 130 extends around the outer periphery of the float 100 and extends around approximately seventy-five percent of the circumference of the float 100 (as best seen in FIG. 2). The float 100 is comprised of a lightweight watertight material, such as a dense foam material so as to float when water comes in contact therewith and may be coated with a plastic (or more rigid) material on its exterior to ensure weatherproofing due to exposure to the elements. The base 120 of the float 100 is rounded to facilitate water flow there around and down to the waterspout contained within the gutter 300. Bright colors are use to help in spotting the upward extending vertical indicator portion 110 of the GOGA 1000.

FIG. 7 is a diagram of the float wire 200, which encases the float 100 and positions the GOGA 1000 within the gutter 300. The float wire 200 has a circular waistband 230, which resides within the groove 130 of the float 100 extending about the approximate seventy-five percent of the circumference of the float 100. A set of legs extend radially from the waist band 130 forming a first leg 210 and a second leg 220 that splay outward from one another with increasing distance there between, and each terminate with a set of feet 215 and 225 which extend perpendicularly from the respective legs 210 and 220; and wherein said feet 215, 220 have an approximate length ranging from 0.5 to 0.75 inches.

The float wire 200 is comprised of any rust proof substrate materials that hold spring tension, such as lightweight aluminized high tensile steel wire, or equivalents in a preferred embodiment, and has an approximate length in the range of 8-10 inches and an approximate 11-13 Gauge circumference. The first leg 210 and the second leg 220 extend outward from one another at an angle of approximately 23 degrees relative to the center axis of the wire float's waist 230. The first leg 210 and the second leg 220 extend outward with a reach in the approximate range of 5-6 inches apart from distal tip to distal tip of respective feet 215 and 225. Installation of the GOGA 1000 within a gutter 300 is a simple task requiring the wire legs 210 and 220 to be spring snapped within the gutter walls. In some instances, holes within the sidewalls of the gutter 300 may be drilled therein to receive the ends of the wire arms, thus further securing the placement of the Bright colors are use to help in spotting the upward extending vertical indicator portion of the GOGA 1000.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

What is claimed is:

1. A gutter assembly comprising:
at least one elongated gutter member;
a float having a unitary structure with an indicator portion and a bulbous base portion with a waist there between, said waist having a circumference less than both said indicator portion and said bulbous base portion;
said bulbous base portion having a substantially ball shape and containing a recessed groove extending about the periphery of said bulbous base portion;
a float wire having a circular waist band adapted and configured to circumferentially encase said bulbous base portion within said recessed groove, and having a set of legs that extend radially from said circular waist band; and
wherein said legs secure said float within said gutter member so that said float is able to move up and down to provide an indication of an obstruction in said gutter member.

2. The gutter obstruction gauge apparatus of claim 1, wherein:
said recessed groove is located substantially equidistant from the waist of said cylindrical float and the bulbous base portion; and
said set of legs of said float wire each having a set of feet extending perpendicularly there from.

3. The gutter obstruction gauge apparatus of claim 2, wherein:
said recessed groove extends about approximately seventy-five percent of the circumference of said bulbous base portion; and wherein said legs splay outward from one another with increasing distance there between.

4. The gutter obstruction gauge apparatus of claim 3, wherein:
said float having a substantially conically cylindrical shape and comprised of a lightweight watertight material, such as a dense foam adapted to float when water comes in contact therewith,
and said float having a lightweight rigid, exterior bright colored coating.

5. The gutter obstruction gauge apparatus of claim 4, wherein:
the float has dimensions having an approximate height range of 3.5 to 4 inches with a maximum circumference in the range of 1.5 to 2 inches wide, and the waist having a circumference less than both.

6. The gutter obstruction gauge apparatus of claim 5, wherein:

said float wire is comprised of a rust proof substrate material with spring tension.

\* \* \* \* \*